United States Patent
Hasegawa et al.

(10) Patent No.: US 11,816,184 B2
(45) Date of Patent: Nov. 14, 2023

(54) ORDERING PRESENTATION OF TRAINING DOCUMENTS FOR MACHINE LEARNING

(71) Applicant: International Business Machines Corporation, Armonk, NY (US)

(72) Inventors: Tohru Hasegawa, Tokyo (JP); Kaoru Ohashi, Tokyo (JP); Steven Michael Pritko, Pittsburgh, PA (US); Aaron Santavicca, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 17/206,980

(22) Filed: Mar. 19, 2021

(65) Prior Publication Data

US 2022/0300762 A1 Sep. 22, 2022

(51) Int. Cl.
| | | |
|---|---|---|
| *G06F 18/214* | (2023.01) | |
| *G06N 20/00* | (2019.01) | |
| *G06V 30/416* | (2022.01) | |
| *G06F 18/22* | (2023.01) | |
| *G06F 18/2113* | (2023.01) | |

(52) U.S. Cl.
CPC ...... *G06F 18/2148* (2023.01); *G06F 18/2113* (2023.01); *G06F 18/22* (2023.01); *G06N 20/00* (2019.01); *G06V 30/416* (2022.01); *G06T 2207/30176* (2013.01)

(58) Field of Classification Search
CPC ............ G06F 16/355; G06F 18/2113; G06F 18/2148; G06F 18/22; G06N 20/00; G06V 10/945; G06V 30/19147; G06V 30/40; G06V 30/416; G06T 2207/30176
See application file for complete search history.

(56) References Cited

U.S. PATENT DOCUMENTS

| | | | |
|---|---|---|---|
| 8,880,994 B1 | 11/2014 | Lutz | |
| 9,275,135 B2 * | 3/2016 | De | G06F 16/355 |
| 10,534,846 B1 * | 1/2020 | Sanghavi | G06V 30/414 |
| 2005/0134935 A1 * | 6/2005 | Schmidtler | G06F 40/10 |
| | | | 358/448 |
| 2006/0190489 A1 * | 8/2006 | Vohariwatt | G06Q 10/00 |
| 2007/0203940 A1 * | 8/2007 | Wang | G06F 16/951 |
| 2014/0032558 A1 * | 1/2014 | Renders | G06F 16/5838 |
| | | | 707/E17.09 |
| 2017/0109426 A1 * | 4/2017 | Arora | G06F 16/24578 |
| 2017/0357909 A1 | 12/2017 | Willamowski | |

(Continued)

OTHER PUBLICATIONS

Gonde et al. "Multimodal Graph Based Image Retrieval." International Journal of Advanced Research in Computer Science 5.6 (2014). (Year: 2014).*

*Primary Examiner* — Katrina R Fujita
(74) *Attorney, Agent, or Firm* — Aaron Pontikos

(57) ABSTRACT

A method for one or more processors to select a plurality of documents. The one or more processors calculate a similarity between pairs of pages of respective documents of the plurality of documents. The one or more processors determine a document similarity value of the respective documents of the plurality of documents, based on a quantity of the pairs of pages of the respective document with a similarity calculated to be less than a predetermined threshold, and the one or more processors present the plurality of documents in a descending order, based on the document similarity value of the respective documents of the plurality of documents.

20 Claims, 4 Drawing Sheets

| | PAGE PAIRS (220) | | DISTANCE (230) | <N; N=30 (240) |
|---|---|---|---|---|
| 250 | PAGE 1 | PAGE 2 | 100 | NO |
| 255 | PAGE 1 | PAGE 3 | 80 | NO |
| 260 | PAGE 1 | PAGE 4 | 85 | NO |
| 265 | PAGE 2 | PAGE 3 | 20 | YES |
| 270 | PAGE 2 | PAGE 4 | 15 | YES |
| 275 | PAGE 3 | PAGE 4 | 15 | YES |

(56) References Cited

U.S. PATENT DOCUMENTS

| | | | |
|---|---|---|---|
| 2018/0285176 A1* | 10/2018 | Mozhaev | G06F 16/951 |
| 2019/0251182 A1* | 8/2019 | Ray | G06F 40/169 |
| 2019/0332666 A1* | 10/2019 | Dadachev | G06F 40/284 |
| 2019/0384807 A1* | 12/2019 | Dernoncourt | G06N 3/045 |
| 2019/0392250 A1* | 12/2019 | Aggarwal | G06N 20/00 |
| 2020/0210888 A1 | 7/2020 | Eldardiry | |
| 2020/0218719 A1* | 7/2020 | Eifert | G06F 16/2465 |
| 2020/0293712 A1 | 9/2020 | Potts | |
| 2021/0110527 A1* | 4/2021 | Wheaton | G06T 7/0002 |
| 2021/0225466 A1* | 7/2021 | Barkan | G06F 16/35 |
| 2021/0294851 A1* | 9/2021 | Talwadker | G06V 30/40 |
| 2021/0319356 A1* | 10/2021 | Wang | G06V 30/40 |

* cited by examiner

| PAGE PAIRS | | DISTANCE | <N; N=30 |
|---|---|---|---|
| PAGE 1 | PAGE 2 | 100 | NO |
| PAGE 1 | PAGE 3 | 80 | NO |
| PAGE 1 | PAGE 4 | 85 | NO |
| PAGE 2 | PAGE 3 | 20 | YES |
| PAGE 2 | PAGE 4 | 15 | YES |
| PAGE 3 | PAGE 4 | 15 | YES |

ORDERING PRESENTATION OF TRAINING DOCUMENTS FOR MACHINE LEARNING

FIELD OF THE INVENTION

The present invention relates generally to the field of training machine learning models and more particularly to reducing manual annotations by ordering the presentation of training dataset documents to automated annotation tools, based on similarity within content pages of the training documents.

BACKGROUND OF THE INVENTION

Machine learning is a type of artificial intelligence (AI) in which a computer-based system learns from data as opposed to explicitly from programming. AI employs algorithms that receive input of training data resulting in models that given a specific input, determine a learned output. Machine learning models become more precise as the algorithms consume greater quantities of training data, and through time, quantities of data in general.

Training datasets are quantities of data selected based on the type of data and the particular purpose to which the learning model is to be applied. Training datasets often include labeling certain aspects or attributes of the data, particularly unstructured data, such as text. The labeling of document content is often referred to as annotating or annotation of the document content, which facilitates the recognition, categorization, and relationship of the data. Annotation of datasets can be facilitated by applications, sometimes referred to as auto-annotation tools or annotation services, that are used to generically categorize unstructured data and are often augmented and corrected manually.

The advantage of annotating unstructured data is that it is possible to use algorithms and models to retrieve, compare, and correlate content, as well as determine meaning and sentiment from the unstructured data, enabling machine learning models.

SUMMARY

Embodiments of the present invention disclose a method, computer program product, and system. The embodiments include a method for efficient annotation of a plurality of documents. The method provides for one or more processors to select a plurality of documents. The one or more processors calculate a similarity between pairs of pages of respective documents of the plurality of documents, The one or more processors determine a document similarity value of the respective documents of the plurality of documents, based on a quantity of the pairs of pages of the respective document with a similarity calculated to be less than a predetermined threshold, and the one or more processors present the plurality of documents in a descending order, based on the document similarity value of the respective documents of the plurality of documents.

DETAILED DESCRIPTION

Figure 1:
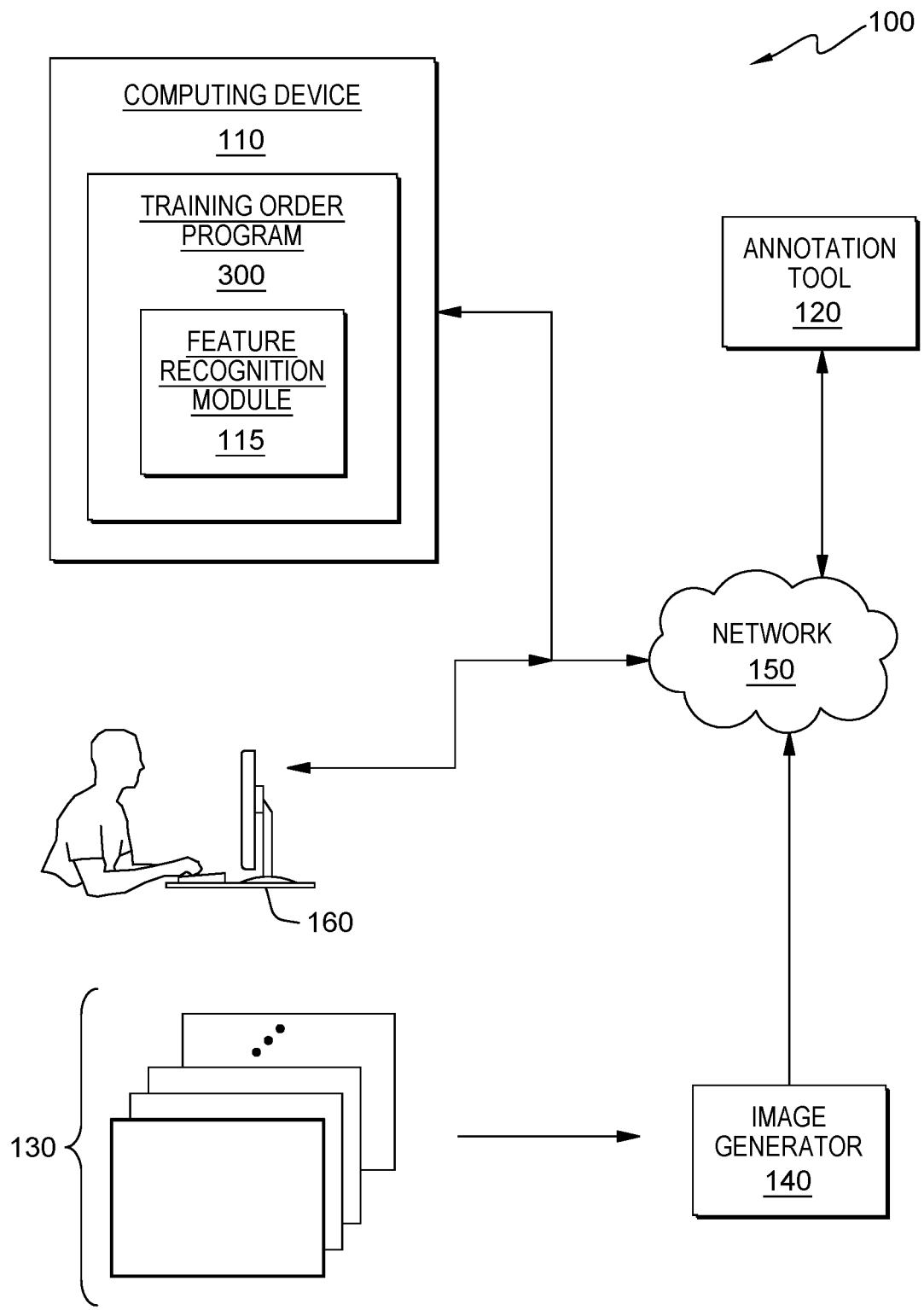
FIG. 1 is a functional block diagram illustrating a distributed data processing environment, in accordance with an embodiment of the present invention.

Embodiments of the present invention recognize that artificial intelligence (AI) and machine learning (ML) techniques are applied to multiple areas of predictive and decision-making modeling. Machine learning techniques enable programming applications to learn from large amounts of training data that often includes corrected data labeling and corrected output. Embodiments also recognize that data labeling applications are often used to analyze unstructured data, such as text-based documents, and provide default labeling of the data. The default labeling of data sometimes referred to as annotating or annotation of the data adds metadata labeling that may include text extraction, named entity recognition, semantic and sentiment labeling, categorization, keyword extraction, and linguistic component identification, used for description, classification, or categorization of the unstructured data.

Embodiments of the present invention recognize that annotation tools supporting the preparation of datasets used in machine learning applications may provide a default model to apply annotations to datasets, such as a corpus of documents. Embodiments also recognize that the quality of models to which datasets apply depends on the quality of the training data used.

Embodiments of the present invention recognize that text-based document data labeled by auto-annotation tools are manually reviewed with a user reviewing each document page-by-page. The user confirms the default annotations made by the auto-annotation tool are correct, and otherwise performs manual annotation corrections. Users make manual time-consuming corrections to inaccurate or incomplete auto-annotation data labeling of documents. Embodiments recognize that manually reviewing each page of a document of a plurality of multi-page documents can result in a significant user effort in preparing training data. Embodiments also recognize that inadequate manual annotation correction can result in poor model performance, and excessive manual annotation can produce bias errors in model results, both of which affect the usefulness of the model.

Embodiments of the present invention reduce the amount of manual correction of auto-annotations by re-ordering the sequence in which the documents are presented to the auto-annotation model and subsequently to a machine learning model for training. Embodiments reorder the training documents presented to the auto-annotation model by presenting the documents in a descending order, based on the document similarity value. In some embodiments, the training material for machine learning algorithms and artificial intelligence models involves large quantities of selected documents, each of which may include multiple pages of content within the document. Embodiments of the present invention reduce the amount of manual correction effort in preparing training documents for machine learning and artificial intelligence applications.

Embodiments of the present invention provide a method, computer program product, and computer system for reducing manual annotation activity (i.e., adding, editing, removing) of documents prepared for model training by defining an order of presentation of the training documents based on determining a similarity between page pairings of a document. In some embodiments, an image generator generates an image of each page of a document, of a plurality of documents intended for training a model for machine learning and/or artificial intelligence applications. Embodiments calculate a similarity distance for features of the image of each page of the page pairings of the document and compares the calculated similarity distance to a predetermined threshold of similarity.

A similarity distance functions as an inverse indicator of similarity in which a greater similarity distance indicates a lower degree of similarity, and a lesser similarity distance indicates a greater degree of similarity. Embodiments of the present invention determine a document similarity (DS) value by determining the quantity of page pairings of the respective document with calculated similarity distances less than the predetermined threshold of similarity. Subsequent to determining a DS value for the respective documents of the plurality of documents prior to submitting the documents to a data labeling model of an annotation tool, the documents are reordered and submitted to the data labeling model in an order of descending DS values.

For example, embodiments of the present invention prepare three documents, A, B, and C, as training documents intended for training a machine learning model, and determine that documents A, B, and C contain ten or more pages of content. Embodiments generate images of each page of each respective document, and identify features of the respective page images, including the relative locations within the image and attributes of the features. Embodiments calculate a similarity distance between features of the page images of each page pairing of the document. For example, a similarity method in which each page is represented by a vector in multidimensional space, and the distance between vectors determines the similarity distance.

There are at least forty-five page pairing combinations for a ten page-plus document. Embodiments of the present invention calculate similarity distances for the page pairings and compare the similarity distances to a predetermined threshold. Embodiments determine a document similarity (DS) value for each document by quantifying the page pairings of a respective document with similarity distances below the predetermined similarity distance threshold. Continuing the example, embodiments determine six page pairings of document B with similarity distances below the threshold (DS=6), document C with three page pairing similarity distances below the threshold (DS=3), and document A with one page pairing similarity distance below the threshold (DS=1). Embodiments reorder the documents to be presented to the data labeling model of the annotation tool in the order of B→C→A, resulting in an improvement of accurate annotations made by the annotation tool model and requiring a reduction in user manual corrections of annotations.

Embodiments of the present invention submit the three documents to an auto-annotation model of a data labeling tool in a descending order with the highest DS value document submitted first and the other documents submitted subsequently in descending DS value order. Embodiments of the present invention result in reduced time and effort of manual correction of auto-annotations made to documents as a result of reordering the presentation of documents to the auto annotation tool based on a descending DS value order. Embodiments of the present invention provide a practical improvement of training data preparation to a technological field of machine learning and artificial intelligence, by reducing the amount of manual adjustment to the auto-applied annotations.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations concerning the environments in which different embodiments may be implemented. Many modifications to the depicted environment may be made by those skilled in the art without departing from the scope of the invention as recited by the claims.

Distributed data processing environment 100 includes computing device 110, annotation tool 120, image generator 140, and computing device 160, all interconnected via network 150. Distributed data processing environment includes document collection 130, which in some embodiments, are stored on a network connected data storage system. In other embodiments, the documents comprising document collection 130 are distributed across two or more network connected storage systems, accessible to computing device 110 via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between computing device 110, annotation tool 120, image generator 140, and user computing device 160 in accordance with embodiments of the present invention.

Computing device 110 is a device capable of performing programmable operations and communicating with other devices of distributed data processing environment 100. Computing device 110 includes training order program 300. In some embodiments, training order program 300, operating on computing device 110, receives images of document collection 130 from image generator 140.

In some embodiments, computing device 110 may be a server computer, a laptop computer, a tablet computer, a smartphone, smartwatch, a wearable computing device, or any programmable electronic mobile device capable of communicating with various components and devices within distributed data processing environment 100, via network 150. In another embodiment, computing device 110 represents a computing system utilizing clustered computers and components (e.g., database server computers, application server computers, etc.) that act as a single pool of seamless resources when accessed within distributed data processing environment 100. In general, computing device 110 represents one or more programmable electronic devices or a combination of programmable electronic devices capable of executing machine-readable program instructions and communicating with, other devices of distributed data processing environment 100, via network 150. Computing device 110 may include internal and external hardware components, depicted in more detail in FIG. 4.

Feature recognition module 115 is a component of training order program 300. Feature recognition module 115 determines features of images of pages of documents from document collection 130 received from image generator 140. In some embodiments, a user operating user computing device 160, accesses document collection 130 and submits the documents to image generator 140. Image generator 140 creates images of individual pages of respective documents of document collection 130 and sends the images to be received by feature recognition module 115 of training order program 300 operating on computing device 110. Feature recognition module 115 identifies features of the images of document pages. In some embodiments, feature recognition module 115 utilizes object recognition techniques to identify features of the images of document pages. In other embodiments, feature recognition module 115 applies optical character recognition techniques to the document page images. In yet other embodiments, feature recognition module 115 defines a pixel area outlining a feature of the respective page images. Feature recognition module 115 provides feature data to training order program 300.

Training order program 300 is an application that determines similarity distances between pairings of pages of a document, based on features of images of the document pages received from feature recognition module 115. Training order program 300 determines a document similarity (DS) value for each document of document collection 130, based on the quantity of page pairings of the respective document that have a similarity distance below a predefined threshold. Training order program 300 determines a DS value for each document of document collection 130 and determines an order of presentation of the documents to annotation tool 120, based on an order of descending DS values. In an example embodiment, training order program 300 uses a similarity function, such as a cosine similarity function, which represents the features of an image of a page of a document as a vector in multi-dimensional space and determines the distance between respective vectors as a similarity measure between pages of the document. It is noted that embodiments of the present invention are not limited by the selection of determining similarity between pages of a document.

Training order program 300 calculates similarity distances between features of pairs of pages of a document, producing a summarized distance value for each page pairing of the document for all respective documents of the corpus used for training. Training order program 300 determines the quantity of page pairings of a document that have a similarity distance below a predetermined threshold and assigns the quantity as a DS value of the respective document. Training order program 300 determines an order in which to present the documents for annotation or annotation review by a user, based on presenting the documents in descending order of DS value.

In another embodiment of the present invention, training order program 300 receives text features of each page of respective documents of the corpus of documents receiving annotations for machine learning training. In the embodiment, feature recognition module 115 identifies text of a page of a document, such as a word, a triplet of 'subject-verb-object', or a sentence, and determines a frequency of the text occurring within the page of the document and may determine the frequency of the identified text within the document and within the corpus of documents. Training order program 300 determines a similarity between page pairings, based on the text frequency of the identified text. Examples of methods of determining the similarity of text-based documents include Jaccard distance, Cosine distance, Euclidean distance, Relaxed Word Mover's Distance, and may utilize term frequency-inverse document frequency (tf-idf) techniques. A person of ordinary skill in the art may apply other techniques of determining similarity between page pairings of a document other than those presented, herein, and not deviate from or limit the features of embodiments of the present invention.

Annotation tool 120 is an auto-annotation application that analyzes pages of a document and provides a default set of annotations to features of the document. Annotation tool 120 adds an initial level of information labels to identify or provide context to document data towards enabling a machine learning model to learn from the content of the document. In some embodiments, the default annotations provided by annotation tool 120 categorize data and identify features of the data, adding structure and context, and organizing the data. In some embodiments, annotation tool 120 includes a data recognition model that is applied to the documents and generates annotations regarding cells of the documents.

A cell is considered a series of characters or glyphs that are separated by defined spaces and are all on the same "line" depending on language text flow and have the same font style/size and color. Annotation tool 120 recognizes the cells of the page of the document as "text" and can include predefined annotation labels identifying the text cells as title, subtitle, heading level 1, heading level 2, text, page header, page footer, page number, or similar labels. A given cell would have a set of feature values associated with the annotations applied by annotation tool 120 during the training of a machine learning model.

Document collection 130 is a plurality of documents selected as training data for a machine learning model or algorithm. In some embodiments of the present invention, document collection 130 includes a plurality of multi-paged documents forming a corpus of documents, selected based on topic and content. Annotation tool 120 receives document collection 130 and performs auto-annotations of the content features of the documents of document collection 130. In some embodiments, the respective documents of document collection 130 are submitted to training order program 300 to determine a similarity between page pairings of each respective document. Each document of document collection 130 receives a document similarity (DS) value, based on the quantity of page pairings that have a similarity less than a predefined threshold. Training order program 300 creates an order of presentation of the documents of document collection 130 to annotation tool 120 by a descending order of DS values of the documents.

Image generator 140 is a device that generates a digitized image of the pages of respective documents of document collection 130. In some embodiments, image generator 140 is a digital scanning device, creating digitized images of document pages. In other embodiments, image generator 140 may be a photographic system that generates digital images of document pages. In some embodiments, image generator 140 generates digital images and delivers the digital images to feature recognition module 115 of training order program 300. Feature recognition module 115 processes the digital images to identify features of respective images, which are used to determine a similarity between pages of documents of document collection 130. In one embodiment, training order program 300 calculates similarity distances between features of page pairings of a respective document of document collection 130, and compares the similarity distances to a predetermined threshold. The page pairings of the respective document that have similarity distances below the predetermined threshold indicate a desired level of similarity (with respect to the threshold) and are included in a quantity used to determine the DS value for a given document of document collection 130.

User computing device 160 receives the reordered documents of document collection 130 and presents the documents to annotation tool 120 in a descending order of DS value, such that the document that has the most page pairings that are similar, relative to the predetermined similarity threshold, is presented to annotation tool 120 for auto-annotation processing before documents having fewer page pairings that are similar, relative to the predetermined threshold.

User computing device 160 may be a server computer, a laptop computer, a tablet computer, a smartphone, a smartwatch, a wearable computing device, or any programmable electronic mobile device capable of communicating with various components and devices within distributed data processing environment 100, via network 150. In another embodiment, user computing device 160 represents a computing system utilizing clustered computers and components (e.g., database server computers, application server computers, etc.) that act as a single pool of seamless resources when accessed within distributed data processing environment 100. In general, user computing device 160 represents one or more programmable electronic devices or a combination of programmable electronic devices capable of executing machine-readable program instructions and communicating with, via network 150. User computing device 160 may include internal and external hardware components, depicted in more detail in FIG. 4.

It is noted that embodiments of the present invention are not limited by the type of training data to which embodiments are applied but are applicable to datasets to which annotations are applied by use of annotating toolsets. For clarity and convenience of presenting the features of embodiments of the invention, datasets will be referred to as documents or a corpus of documents. It is also noted that embodiments are not limited by the type of method or technique used to determine similarity distances between page pairings of a document.

Figures 2A, 2B:
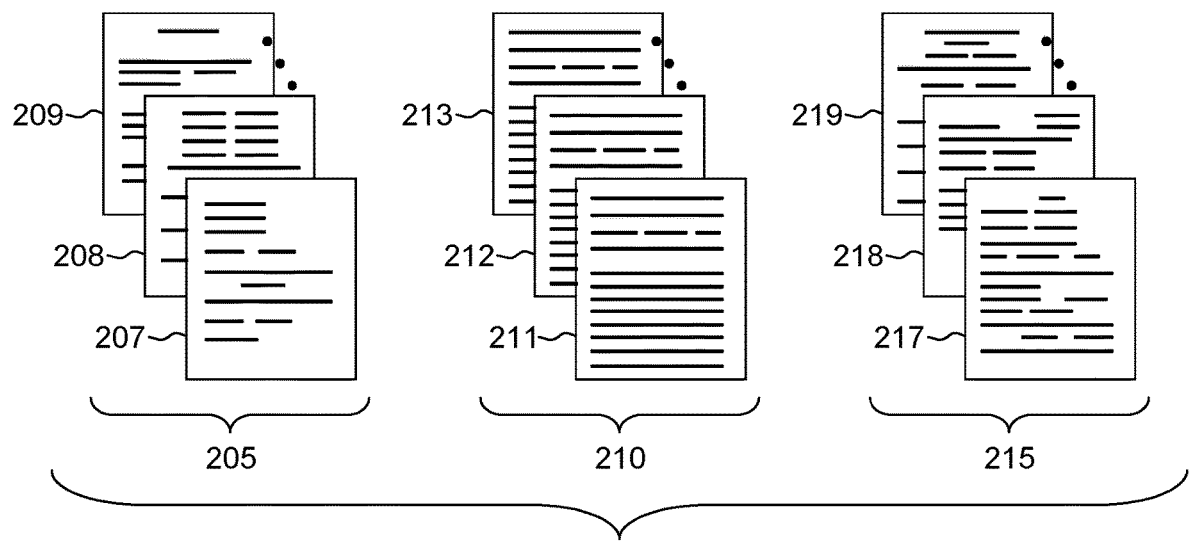
FIG. 2A depicts a set of multi-page documents of a corpus of documents, in accordance with an embodiment of the present invention.
FIG. 2B illustrates a table of example similarity results between page pairs of a document, in accordance with an embodiment of the present invention.

FIG. 2A depicts a set of multi-page documents of a corpus of documents, in accordance with an embodiment of the present invention. FIG. 2A includes document 205, document 210, and document 215, which are depicted as multi-page documents, and the contents of document 205, document 210, and document 215 include text, which is represented by blocks of various lengths. Document 205 includes at least page 207, page 208, and page 209; document 210 includes at least page 211, page 212, and page 213; and document 215 includes at least page 217, page 218, and page 219. In an example embodiment, page 207 of document 205 is depicted with blocks of text that appears dissimilar to page 208 and page 209, and blocks of text of page 208 appear dissimilar to the blocks of text on page 209, which, as an example, would indicate a lower level of similarity between page pairings of document 205.

In the same example embodiment, page 219 of document 215 includes text blocks that appear dissimilar to blocks of text illustrated on page 218 and page 219, and blocks of text of page 218 appear dissimilar to blocks of text on page 219. Page 211 of document 210 is depicted as having content with blocks of text similar to page 212 and page 213, and page 212 also appears to have blocks of text similar to those of page 213. Document 210 has a higher level of similarity between page pairings and may have multiple pairings of pages that include similarity values, such as similarity distances, that indicate a higher level of similarity. In the example embodiment, the document similarity value of document 210 indicates multiple page pairings with a similarity less than a predetermined threshold. In embodiments of the present invention, document 210, having a greater document similarity value, is presented for auto-annotation before the presentation of documents 205 or 215, because both document 205 and document 215 include document similarity values less than that of document 210.

In some embodiments, similarity features used to determine page pairing similarity includes document structural components, such as titles, subtitles, table of contents, lists, tables, graphics, and summaries. In other embodiments, similarity features may be more directed to keywords, topics, and subject matter, sometimes determined by optical character recognition of text images and natural language processing techniques that determine the semantics of words and phrases, parts of speech, and sentiment.

FIG. 2B illustrates a table of example similarity results between page pairings of a document, in accordance with an embodiment of the present invention. FIG. 2B includes page pairing column 220, similarity distance column 230, and less-than-threshold column 240. Table rows include pairing 250, pairing 255, pairing 260, pairing 265, pairing 270, and pairing 275, which represent the example set of pairings of pages of the document. Page pairing column 220 includes instances of individual pairings of document pages to be assessed for similarity. In some embodiments, images are created of each page of the document, and features of the images are identified. The features of a page pairing are assessed for similarity by determining a similarity distance for the page pairing, typically by representing the features in a multi-dimensional vector and determining the distances between the vectors of the pages being paired. Page pairing column 220 lists the combinations of page pairings for the document.

Similarity distance column 230 lists a calculated similarity distance determined for each of the page pairings. Similarity distance column 230 displays the summarized similarity distance of the pairing from features identified in the images of the pages. The similarity distances are represented in relative units associated with the page images. Less-than-threshold column 240 includes a binary indication of whether the similarity distances are less than a predetermined threshold distance. Less-than-threshold column 240 indicates a threshold value of 30 units and includes a determination of whether the similarity distance between page pairings is less than the threshold value by indicating a "YES" or "NO".

Pairing 250 is a row of data associated with the similarity between page 1 and page 2 of the document. Pairing 250 indicates a similarity distance of 100 which is greater than the threshold value of 30 as indicated by the "NO" result in less-than-threshold column 240. Pairing 255 is a table row that includes data associated with the similarity of page 1 and page 3 of the document. Pairing 255 similarity distance of 80 is not less than the threshold. Pairing 260 is a table row of data associated with the similarity between page 1 and page 4 of the document and includes a similarity distance of 85, which is also greater than the threshold value. The pairings of page 1 and page 2, page 1 and page 3, and page 1 and page 4 exceed the threshold similarity value and are not included in the quantity of page pairings contributing to the document similarity value.

Pairing 265 includes data associated with the similarity between page 2 and page 3 of the document and depicts a similarity distance of 20, which is below the threshold value, as indicated by the "YES" response in the less-than-threshold column 240. Pairing 270 and pairing 275 are table rows associated with the similarity between page 2 and page 4, and page 3 and page 4, respectively. Pairing 270 and pairing 275 have similarity distance values of 15 each, well below the threshold value of 30, and are included as page pairings in the quantity contributing to the document similarity value of the example document. The document similarity value for the example document is reflected in FIG. 2B and has a document similarity (DS) value of 3 because three-page pairings have similarity distances below the threshold value. In the example, training order program 300 determines an order of presentation of the documents for auto-annotation by descending DS values in which a document with DS value of 3 or more is presented for auto-annotation ahead of documents having DS values of 2 or less.

Figure 3:
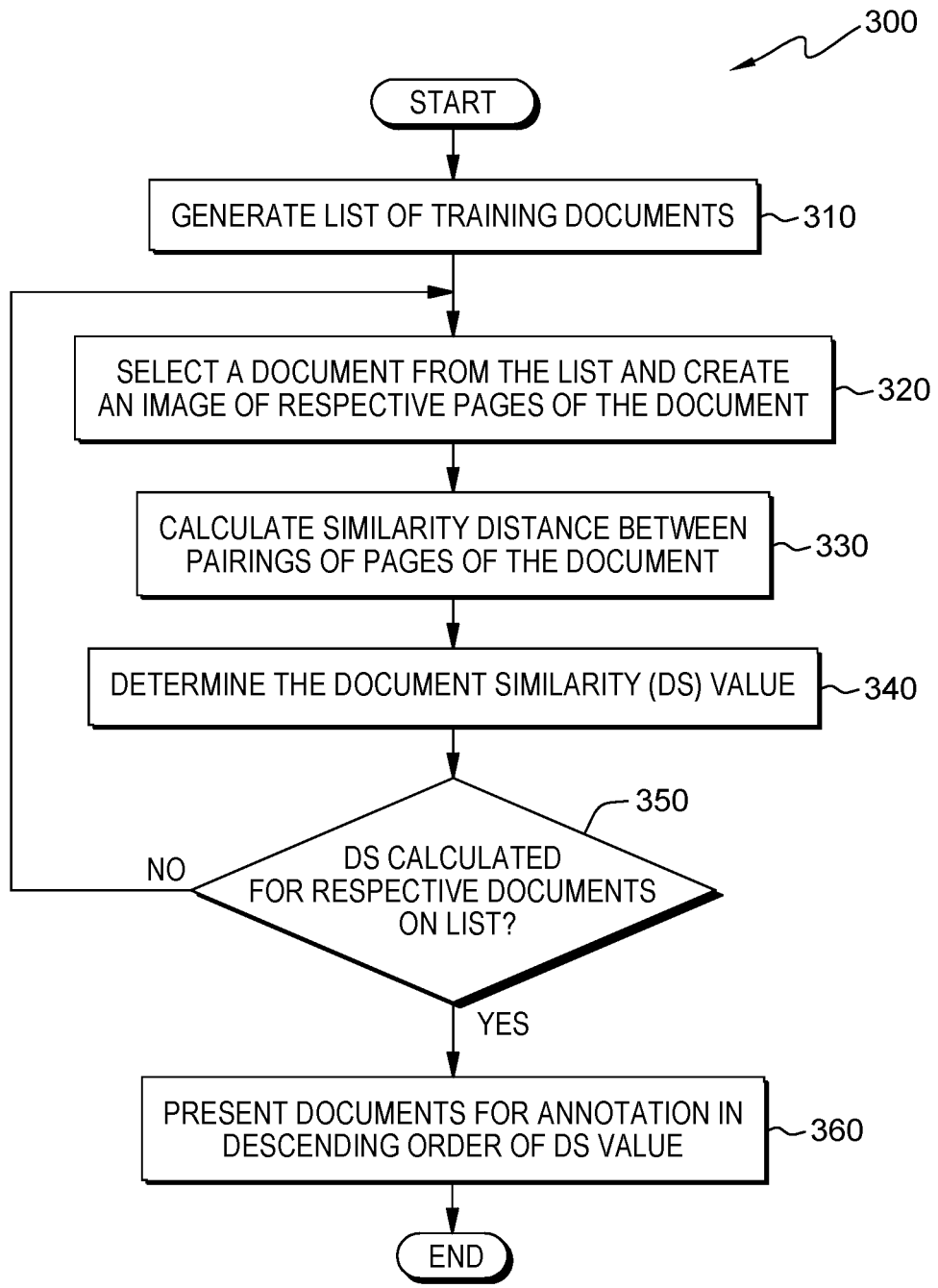
FIG. 3 is a flowchart depicting operational steps of a training order program, operating in the distributed data processing environment of FIG. 1, in accordance with embodiments of the present invention.

FIG. 3 is a flowchart depicting operational steps of training order program 300, operating in the distributed data processing environment of FIG. 1, in accordance with embodiments of the present invention. Training order program 300 determines the document similarity value of respective documents of a document collection to be annotated and submitted for machine learning applications. The document similarity value reflects the quantity of page pairings within a respective document that has a calculated similarity less than a predetermined threshold. In some embodiments of the present invention, training order program 300 calculates the similarity between two pages of a document, based on the similarity distances between features of the pair of pages represented as vectors in multi-dimension space. A greater distance indicates less similarity between pages of the document.

Training order program 300 generates a list of training documents (step 310). In some embodiments, training order program 300 receives input of a collection of documents and generates a listing of the received documents. In some embodiments, training order program 300 identifies the documents as multi-page documents. Machine learning models and algorithms use the list of documents that receive annotations from auto-annotation services as training input.

For example, training order program 300 receives access information for a plurality of text documents intended to train a machine learning model. Training order program 300 identifies each document and generates a list of the plurality of training documents.

Training order program 300 selects a document from the list and creates an image of each page of the document (step 320). Training order program 300 selects a document and in some embodiments, sends the document to an image generator tool that creates an image of each page of the document. In some embodiments, training order program 300 is enabled with functional control over an image generator. In other embodiments, training order program 300 delivers the document to a service destination address and receives images of the pages of the document from the image creating service. In yet other embodiments, training order program 300 includes an image generation module that receives the pages of the document and generates an image for each page.

The images created from the pages of the document are processed to identify features of the respective images of the pages of the selected document. In some embodiments, the features are determined by defined pixel areas of the image having discernable characteristics, such as a shape or a set of objects within the pixel area. In some embodiments, the features correspond to recognized sets of characters associated with text words or phrases, based on optical character recognition. The feature recognition processing identifies and associates the location of the features within the image of the respective pages of the document.

For example, Training order program 300 selects a document from the list of training documents, such as document collection 130 (FIG. 1), and forwards the document to image generator 140. Image generator 140 creates images of the respective pages of the document and sends the images to training order program 300 operating on computing device 110. The images of the respective pages of the document are delivered to feature recognition module 115 of training order program 300, which processes the respective images and identifies features within the image. Feature recognition module 115 generates metadata identifying the feature and the location of the feature within the image and associates the metadata with the image file of respective pages of the document.

Training order program 300 calculates a similarity distance between pairings of pages of the document (step 330). In some embodiments of the present invention, training order program 300 calculates a similarity distance of respective features between a pair of pages of the document. The similarity distance may be calculated by using one of many similarity techniques, for example, using cosine similarity calculations between each feature of the page pairings and summarizing the similarity distances of the features as a total for the page pairings. In embodiments of the present invention, the similarity distance is determined for each possible non-redundant page pairing of the document.

Embodiments are not limited by the type or means of determining similarity between page pairings of a document, given that the predetermined threshold is established in the same context as the similarity values. A common way to measure similarity between two text documents is by determining the distance in a vector space. A vector space model can be created by using features of an image of document pages, or alternatively, word count, term frequency-inverse document (page) frequency, word embeddings, or document embeddings. Distance is most often measured by cosine similarity, but other measurement methods include Jaccard distance, Cosine distance, Euclidean distance, and Relaxed Word Mover's Distance, or term frequency measurements.

For example, in one embodiment, training order program 300 calculates the similarity distances in vector space between respective features of images of page pairings using a cosine similarity technique. The calculations result in a similarity distance value for the pair of pages of the document. Training order program 300 continues determining the similarity distances between each non-redundant pairing of pages of the document. For example, a document having five pages would have ten possible non-redundant pairings, and a document with 10 pages would have 45 possible non-redundant pairings, expressed in the relationship: (n (n−1)/2). Training order program 300 determines a similarity distance for the respective page pairings of the document.

Training order program 300 determines the document similarity (DS) value (step 340). In some embodiments of the present invention, a predetermined threshold of similarity is established representing a degree of similarity desired for the application of training documents to a machine learning model. In some embodiments, the predetermined similarity threshold may be chosen by a user associated with the machine learning training. In other embodiments, the predetermined threshold may be established by calculating the similarity between a selected subset of page pairings that are representative of a corpus of documents to be annotated for model training. Training order program 300 compares the similarity distances calculated for the respective page pairings of the document and determines the quantity of page pairings whose similarity distances are less than the predetermined threshold. Training order program 300 assigns the quantity of page pairings of a document with similarity distance values below the threshold as the document similarity (DS) value for the document.

For example, a predetermined threshold value of similarity distance is established as a value of thirty. Training order program 300 determines that a first document of document collection 130 has five page pairings with similarity distance values that are less than the predetermined threshold of thirty, indicating the pages of the pairings are more similar than the threshold level. Training order program 300 increments the DS value by five, which is consistent with the five page pairings of the first document that have similarity distances below the predetermined threshold value.

Training order program 300 determines whether DS values have been calculated for all documents (decision step 350). Training order program 300 references the list of training documents identified for auto-annotation and annotation review prior to applying the documents to a machine learning model for training of the model. Training order program 300 determines whether a DS value has been determined for respective documents of a plurality of documents identified on the list of training documents.

For the case in which training order program 300 determines there are more DS values to be calculated for documents on the list of training documents (step 350, "NO" branch), training order program 300 returns to step 320. Training order program 300, in step 320, selects another document from the list of training documents and creates an image of the respective pages of the document, and training order program 300 proceeds as described above.

For the case in which training order program 300 determines that DS values have been calculated for all training documents (step 350, "YES" branch), training order program 300 presents the documents for annotation in descending order of DS value (step 360). Training order program 300 generates an order of presentation of the plurality of documents, based on a descending order of the DS values determined for each document. In some embodiments, training order program 300 prepares the descending order of the documents and presents the documents to the annotation tool in the descending order of DS value, to perform auto-annotation of the training documents.

For example, training order program 300 compares the DS values of document collection 130 and generates an order of presentation based on descending DS values, such that the document with the highest DS value is presented first to annotation tool 120 and the document with the lowest DS value is presented last to annotation tool 120. Having determined the order of presentation of documents for auto-annotation and training (step 360), training order program 300 ends.

Figure 4:
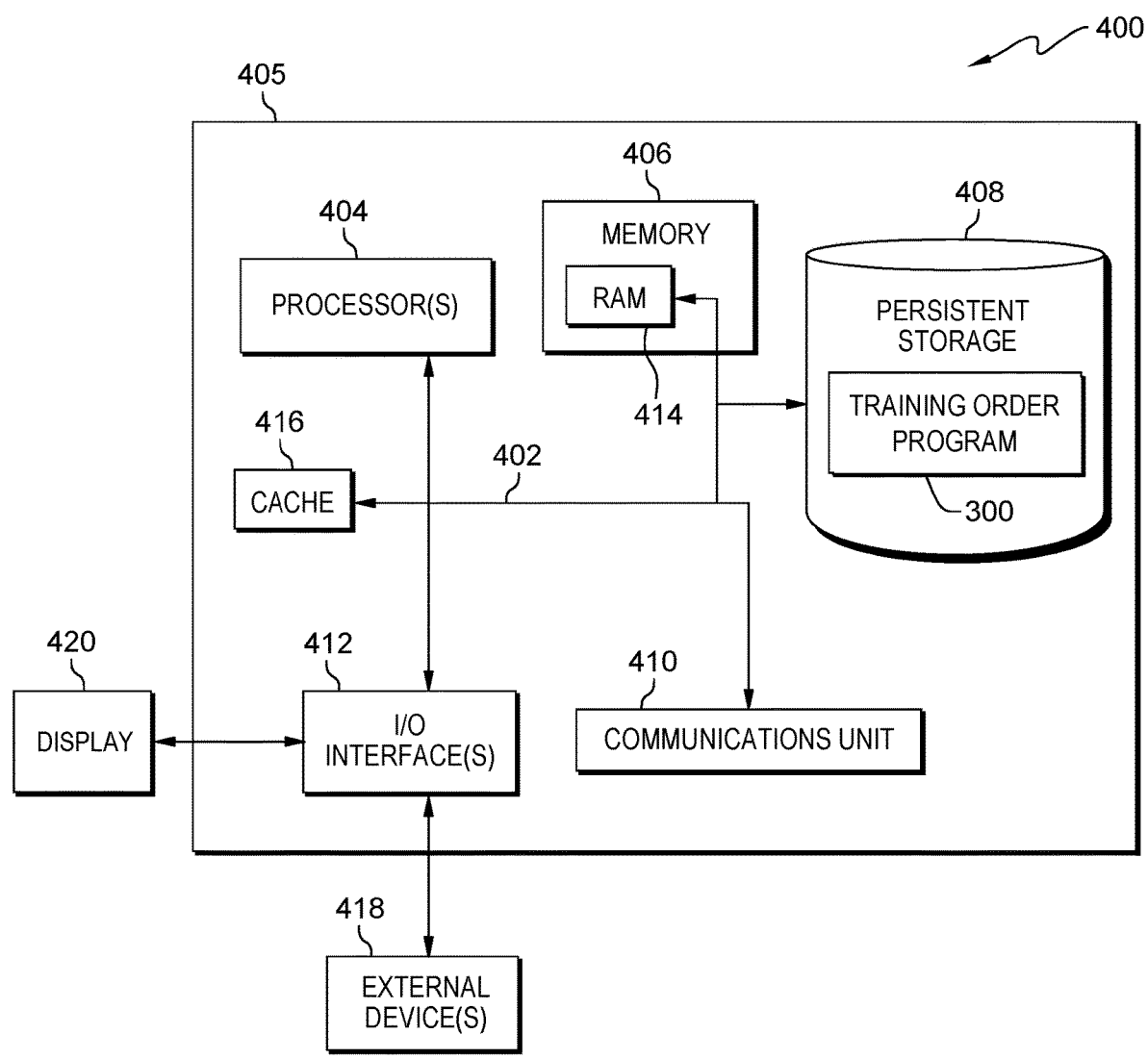
FIG. 4 depicts a block diagram of components of a computing system, including a computing device configured to operationally perform the training order program of FIG. 3, in accordance with an embodiment of the present invention.

FIG. 4 depicts a block diagram of components of computing system 400, including computing device 405, configured to include or operationally connect to components depicted in FIG. 1, and with the capability to operationally perform training order program 300 of FIG. 3, in accordance with an embodiment of the present invention.

Computing device 405 includes components and functional capability similar to components of computing device 110 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, training order program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Training order program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., training order program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for efficient annotation of a plurality of documents, the method comprising:

selecting, by one or more processors, a plurality of documents;

calculating, by the one or more processors, a similarity between pairs of pages of a respective document of the plurality of documents;

determining, by the one or more processors, a document similarity value of the respective document of the plurality of documents, based on a quantity of the pairs of pages within the respective document with the similarity calculated to be less than a predetermined threshold; and presenting, by the one or more processors, the plurality of documents in a descending order, based on the document similarity value of respective documents of the plurality of documents.

2. The method of claim 1, wherein the plurality of documents are presented to an auto-annotation tool in the descending order by the document similarity value.

3. The method of claim 1, further comprising:

creating, by the one or more processors, an image of respective pages of the respective documents of the plurality of documents; and identifying, by the one or more processors, features associated with the image of the respective pages of the respective documents.

4. The method of claim 1, further comprising:

responsive to determining a similarity distance between a set of pairs of pages of the respective document is less than the predetermined threshold, incrementing, by the one or more processors, the quantity contributing to the document similarity value of the respective document by a number of pairs of pages in the set.

5. The method of claim 1, wherein the similarity between the pairs of pages of the respective document of the plurality of documents is calculated by determining a Euclidean distance between features of an image of respective pages of the pair of pages of the respective document.

6. The method of claim 1, wherein the similarity between pairs of pages of the respective documents is calculated based on a term frequency technique applied to text of the respective documents.

7. The method of claim 1, wherein the predetermined threshold is determined by calculating the similarity between a selected subset of page pairings that are representative of a corpus of documents to be annotated for model training.

8. A computer program product for efficient annotation of a plurality of documents, the computer program product comprising:

one or more computer-readable storage media, and program instructions stored on the one or more computer-readable storage media, the program instructions comprising:

program instructions to select a plurality of documents;

program instructions to calculate a similarity between pairs of pages of a respective document of the plurality of documents;

program instructions to determine a document similarity value of the respective document of the plurality of documents, based on a quantity of the pairs of pages within the respective document with the similarity calculated to be less than a predetermined threshold; and program instructions to present the plurality of documents in a descending order, based on the document similarity value of respective documents of the plurality of documents.

9. The computer program product of claim 8, wherein program instructions include presenting the plurality of documents to an auto-annotation tool in the descending order by document similarity value.

10. The computer program product of claim 8, wherein the one or more computer-readable storage media include program instructions, further comprising:

program instructions to create an image of respective pages of the respective documents of the plurality of documents; and program instructions to identify features associated with the image of the respective pages of the respective documents.

11. The computer program product of claim 8, wherein the one or more computer-readable storage media include program instructions, further comprising:

responsive to determining a similarity distance between a set of pairs of pages of the respective document is less than the predetermined threshold, incrementing, by the one or more processors, the quantity contributing to the document similarity value of the respective document by a number of pairs of pages in the set.

12. The computer program product of claim 8, wherein program instructions calculate the similarity between the pairs of pages of the respective document of the plurality of documents by determining a Euclidean distance between features of an image of the pair of pages of the respective document.

13. The computer program product of claim 8, wherein program instructions base the similarity between pairs of pages of the respective documents on a term frequency technique applied to text of the respective documents.

14. The computer program product of claim 8, wherein the predetermined threshold is determined by program instructions calculating the similarity between a selected subset of page pairings that are representative of a corpus of documents to be annotated for model training.

15. A computer system for efficient annotation of a plurality of documents, the computer system comprising:

one or more computer processors;

one or more computer-readable storage media, and program instructions stored on the one or more computer-readable storage media, the program instructions comprising:

program instructions to select a plurality of documents;

program instructions to calculate a similarity between pairs of pages of a respective document of the plurality of documents;

program instructions to determine a document similarity value of the respective document of the plurality of documents, based on a quantity of the pairs of pages within the respective document with the similarity calculated to be less than a predetermined threshold; and program instructions to present the plurality of documents in a descending order, based on the document similarity value of respective documents of the plurality of documents.

16. The computer system of claim 15, wherein the one or more computer-readable storage media include program instructions, further comprising:

program instructions to create an image of respective pages of the respective documents of the plurality of documents; and program instructions to identify features associated with the images of the respective pages of the respective documents.

17. The computer system of claim 15, wherein the one or more computer-readable storage media include program instructions, further comprising:
responsive to determining a similarity distance between a set of pairs of pages of the respective document is less than the predetermined threshold, incrementing, by the one or more processors, the quantity contributing to the document similarity value of the respective document by a number of pairs of pages in the set.

18. The computer system of claim 15, wherein program instructions calculate the similarity between the pairs of pages of the respective document of the plurality of documents by determining a Euclidean distance between features of an image of the pair of pages of the respective document.

19. The computer system of claim 15, wherein program instructions base the similarity between pairs of pages of the respective documents on a term frequency technique applied to text of the respective documents.

20. The computer system of claim 15, wherein the predetermined threshold is determined by program instructions calculating the similarity between a selected subset of page pairings that are representative of a corpus of documents to be annotated for model training.

* * * * *